(12) United States Patent
Mohtar et al.

(10) Patent No.: US 10,227,917 B2
(45) Date of Patent: Mar. 12, 2019

(54) PASSIVE INLET-ADJUSTMENT MECHANISMS FOR COMPRESSOR, AND TURBOCHARGER HAVING SAME

(71) Applicant: Honeywell International Inc., Moris Plains, NJ (US)

(72) Inventors: Hani Mohtar, Chaumousey (FR); Stephane Pees, Meurthe-et-Moselle (FR); Pascal Delapierre, Vaxoncourt (FR); William Joseph Smith, Gardena, CA (US); Pascal Villemin, Girancourt (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 15/791,412

(22) Filed: Oct. 24, 2017

(65) Prior Publication Data

US 2018/0045107 A1    Feb. 15, 2018

Related U.S. Application Data

(62) Division of application No. 14/615,428, filed on Feb. 6, 2015, now Pat. No. 9,822,698.

(51) Int. Cl.
*F02B 37/24*    (2006.01)
*F01D 17/14*    (2006.01)
(Continued)

(52) U.S. Cl.
CPC ............... *F02B 37/24* (2013.01); *F01D 5/02* (2013.01); *F01D 17/141* (2013.01); *F01D 25/24* (2013.01);
(Continued)

(58) Field of Classification Search
CPC .. F04D 29/4213; F04D 29/4206; F04D 17/10; F01D 17/141; F01D 5/02;
(Continued)

(56) References Cited

U.S. PATENT DOCUMENTS 2,637,486 A    5/1953    Taylor, Jr.
5,333,990 A    8/1994    Foerster
(Continued)

FOREIGN PATENT DOCUMENTS

DE    102010026176 A1    1/2012
DE    102011121996 B4    6/2013
(Continued)

*Primary Examiner* — Umashankar Venkatesan
(74) *Attorney, Agent, or Firm* — John C. James

(57) ABSTRACT

A centrifugal compressor for a turbocharger includes a passive inlet-adjustment mechanism in an air inlet for the compressor, operable to move between an open position and a closed position solely by aerodynamic forces on the mechanism. The inlet-adjustment mechanism includes a plurality of flexible vanes collectively forming a duct, and an effective diameter of the air inlet at the inducer portion of the compressor wheel is determined by a trailing edge inside diameter of the duct. The vanes are movable solely by aerodynamic forces exerted on the vanes by the air flowing to the compressor wheel. The duct has a tapering configuration when the vanes are in a relaxed state, but under aerodynamic force the vanes flex outwardly and increase the trailing edge inside diameter of the duct, thereby increasing an effective diameter of the air inlet.

11 Claims, 10 Drawing Sheets

(51) Int. Cl.
  *F04D 27/02* (2006.01)
  *F02C 6/12* (2006.01)
  *F04D 29/46* (2006.01)
  *F01D 5/02* (2006.01)
  *F01D 25/24* (2006.01)
  *F02B 33/40* (2006.01)
  *F04D 17/10* (2006.01)
  *F04D 29/42* (2006.01)

(52) U.S. Cl.
  CPC ............... *F02B 33/40* (2013.01); *F02C 6/12* (2013.01); *F04D 17/10* (2013.01); *F04D 27/0253* (2013.01); *F04D 29/4206* (2013.01); *F04D 29/4213* (2013.01); *F04D 29/464* (2013.01); *F05D 2220/40* (2013.01); *F05D 2240/24* (2013.01); *F05D 2250/51* (2013.01); *F05D 2270/101* (2013.01); *Y02T 10/144* (2013.01)

(58) Field of Classification Search
  CPC ............... F01D 25/24; F05D 2250/51; F05D 2270/101; F05D 2240/24; F05D 2220/40; F02C 6/12; F02B 37/24; F02B 33/40
  See application file for complete search history.

(56) References Cited

U.S. PATENT DOCUMENTS

| | | |
|---|---|---|
| 5,385,974 A | 1/1995 | Ohmae et al. |
| 8,070,416 B2 | 12/2011 | Gottemoller |
| 8,882,444 B2 | 11/2014 | Williams |
| 2010/0260595 A1 | 10/2010 | Gottemoller et al. |
| 2016/0146099 A1 | 5/2016 | Mohtar et al. |

FOREIGN PATENT DOCUMENTS

| | | |
|---|---|---|
| DE | 102013003418 A1 | 8/2014 |
| JP | 3719337 B2 | 9/2005 |
| WO | 2013074503 A1 | 5/2013 |

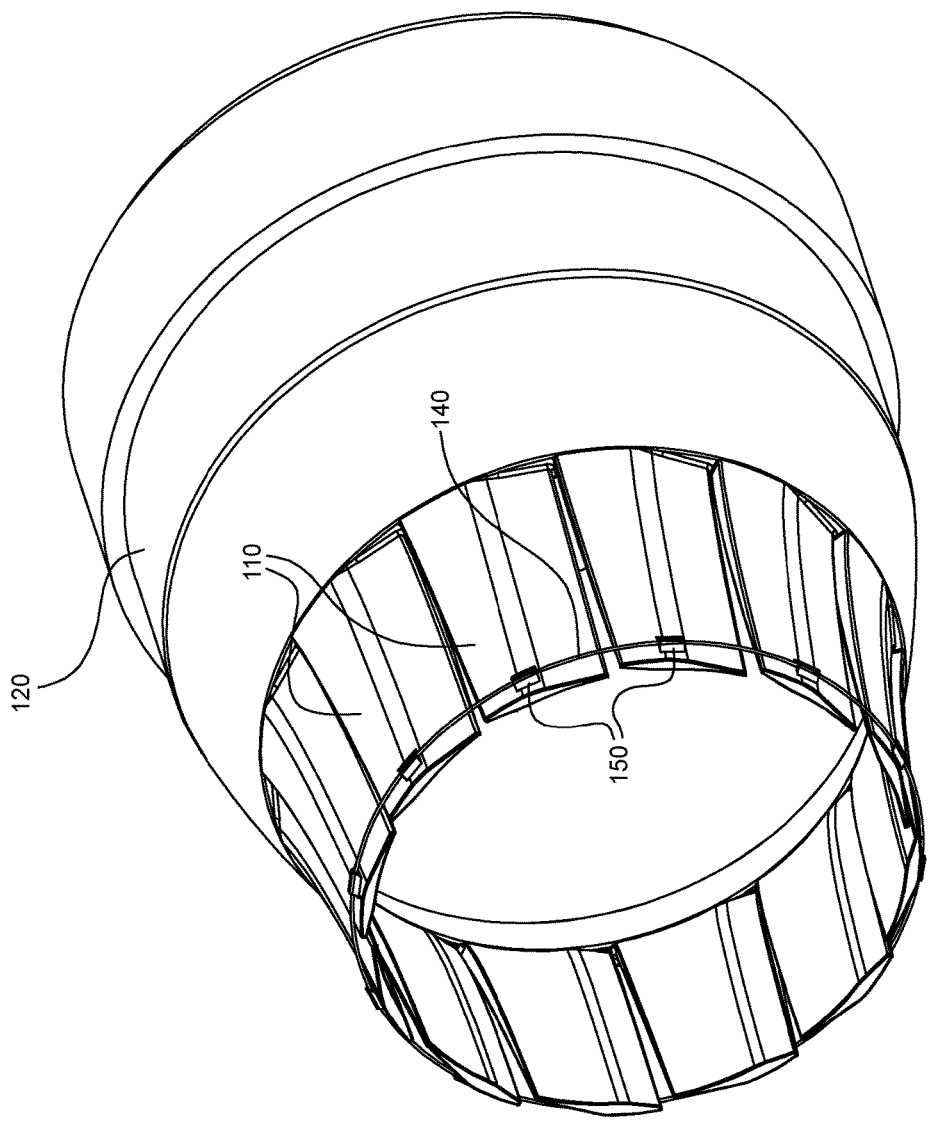

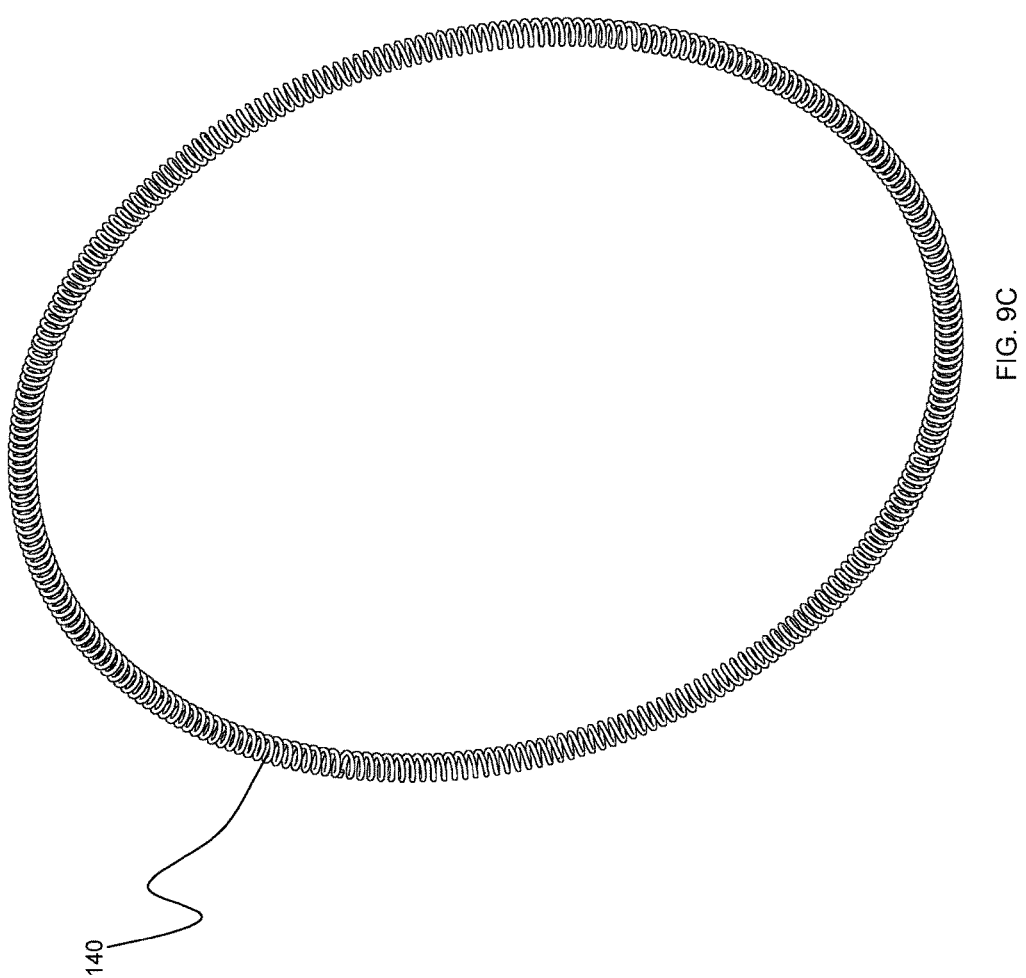

PASSIVE INLET-ADJUSTMENT MECHANISMS FOR COMPRESSOR, AND TURBOCHARGER HAVING SAME

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure $P_{out}$ divided by inlet pressure $P_{in}$) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

A number of methods are described in the prior art for increasing compressor range, such as a variable vane diffuser or the use of inlet guide vanes to increase the surge margin. A drawback associated with such systems is that they require an actuation system, which requires additional space, cost, and complexity. There is therefore a need for a solution that addresses the above-mentioned limitations.

BRIEF SUMMARY OF THE DISCLOSURE

The present disclosure describes passive mechanisms for a centrifugal compressor that can enable the surge line for the compressor to selectively be shifted to the left (i.e., surge is delayed to a lower flow rate at a given pressure ratio), without requiring any actuator. One embodiment described herein comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the inducer portion of the compressor wheel, the compressor housing further defining a volute for receiving compressed air discharged generally radially outwardly from the compressor wheel, the air inlet having an inner surface that extends for an axial length along a downstream direction, followed by a passive inlet-adjustment mechanism disposed in the air inlet, followed by a shroud surface that is adjacent to outer tips of the blades of the compressor wheel.

The passive inlet-adjustment mechanism comprises a plurality of vanes constructed of a flexible material, the vanes having leading edges joined to a ring mounted in the air inlet and the vanes being distributed circumferentially about the ring such that the ring and the vanes collectively form a duct. An effective diameter of the air inlet at the inducer portion is determined by a trailing edge inside diameter of the duct. The vanes are movable solely by aerodynamic forces exerted on the vanes by the air flowing to the compressor wheel. The duct has a tapering configuration when the vanes are in a relaxed state such that the trailing edge inside diameter of the duct is smaller than that of the shroud surface. Aerodynamic forces exerted radially outwardly on the vanes cause the vanes to flex generally radially outwardly and thereby increase the trailing edge inside diameter of the duct at the inducer portion, thereby increasing the effective diameter of the air inlet.

At low flow rates (e.g., low engine speeds) where aerodynamic forces on the vanes are small, the passive inlet-adjustment mechanism will move to the closed position (i.e., the vanes will be at or near their relaxed positions). This has the effect of reducing the effective inlet diameter into the inducer portion of the compressor wheel and thereby increasing the flow velocity into the wheel. The result will be a reduction in compressor blade incidence angle, effectively stabilizing the flow, making blade stall and compressor surge less likely. In other words, the surge line of the compressor will be moved to lower flow rates (to the left on a map of compressor pressure ratio versus flow rate).

At high flow rates, the passive mechanism partially or fully opens (i.e., the vanes flex outwardly), depending on the particular operating conditions. When the passive mechanism is fully opened, the compressor regains its high-flow performance and choke flow characteristics, essentially as if the inlet-adjustment mechanism were not present and as if the compressor had a conventional inlet matched to the wheel diameter at the inducer portion of the wheel.

In one embodiment the ring is formed separately from the compressor housing and is affixed within the air inlet of the compressor housing. The ring can be formed of a different material from the flexible material of the vanes. For example, the ring in one embodiment is formed of metal.

Alternatively the ring can be formed of the same flexible material as the vanes.

In one embodiment, in the relaxed state of the vanes there are gaps in a circumferential direction between the side edges of adjacent vanes.

In another embodiment, in the relaxed state the vanes partially overlap in a circumferential direction.

In order to counteract any tendency of the vanes to flutter during operation, in one embodiment a biasing member encircles the duct adjacent the trailing edge thereof, the biasing member exerting a generally radially inward biasing force on the vanes. The biasing member can comprise, for example, a metal spring wire, an elastomeric ring, a coiled hoop, or the like.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 2:
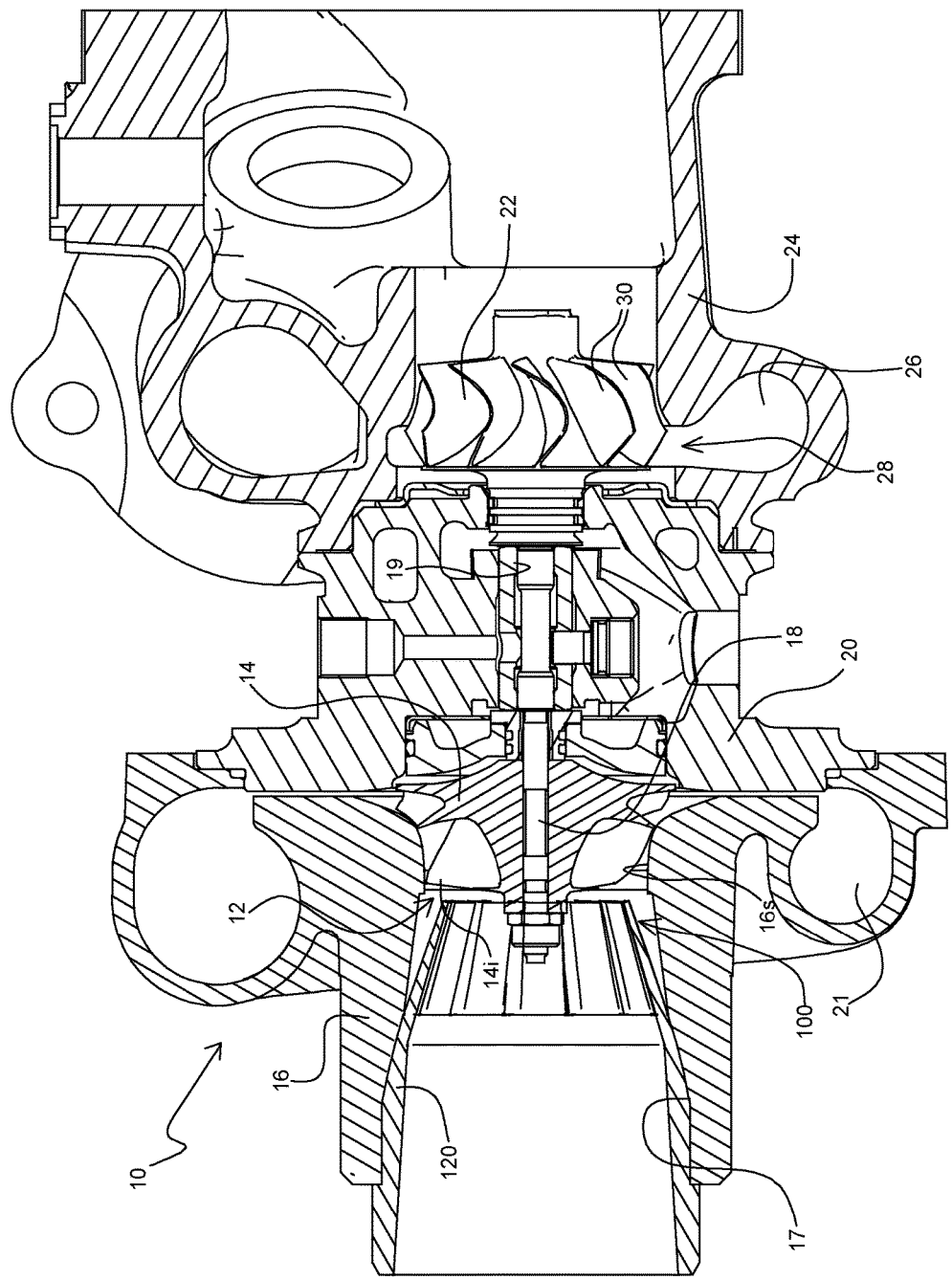
FIG. 2 is an axial cross-sectional view of the turbocharger of FIG. 1, with the inlet-adjustment mechanism in the closed position.
Figure 3:
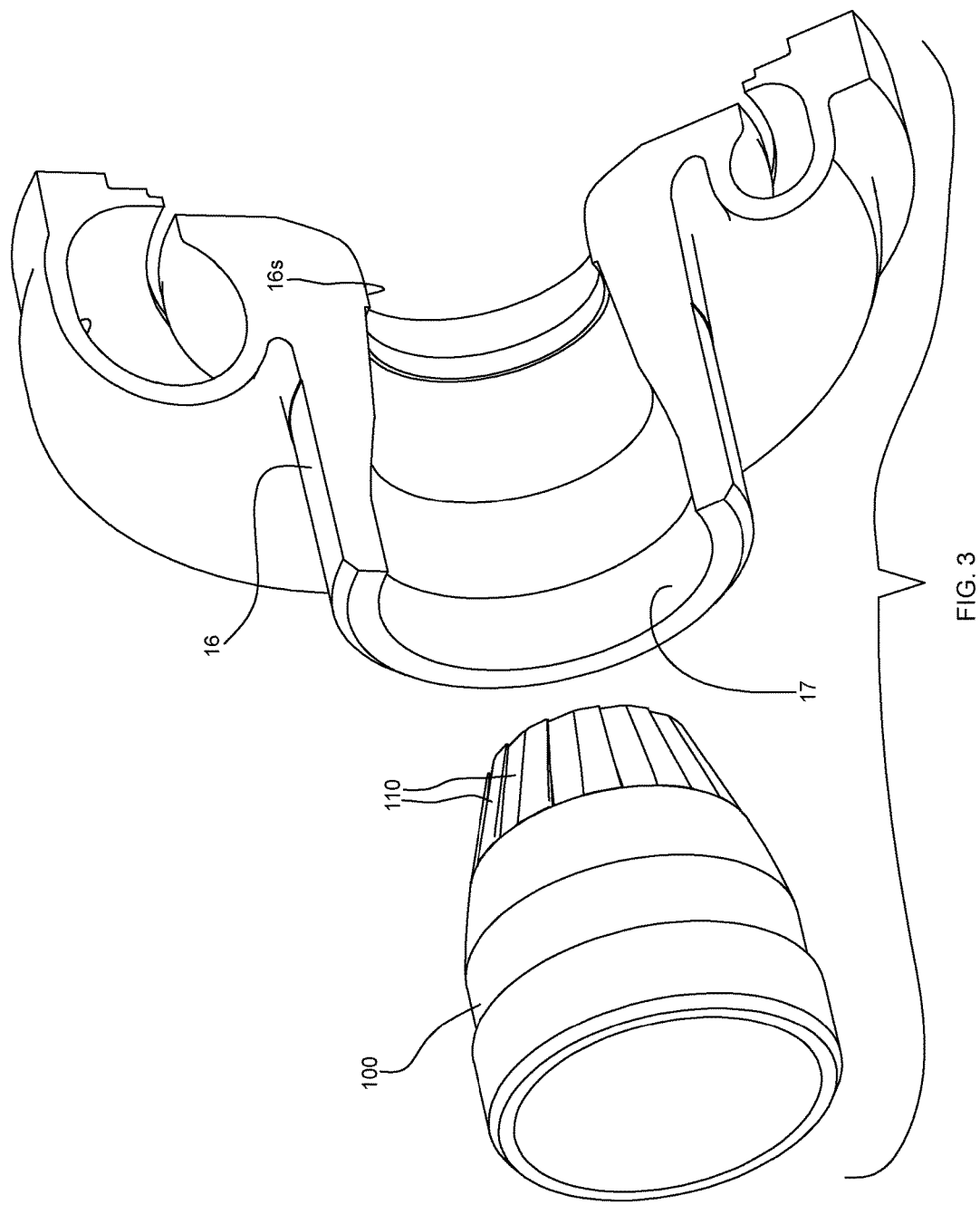
FIG. 3 is an exploded view of the compressor housing and the inlet-adjustment mechanism in the closed position.
Figure 4:
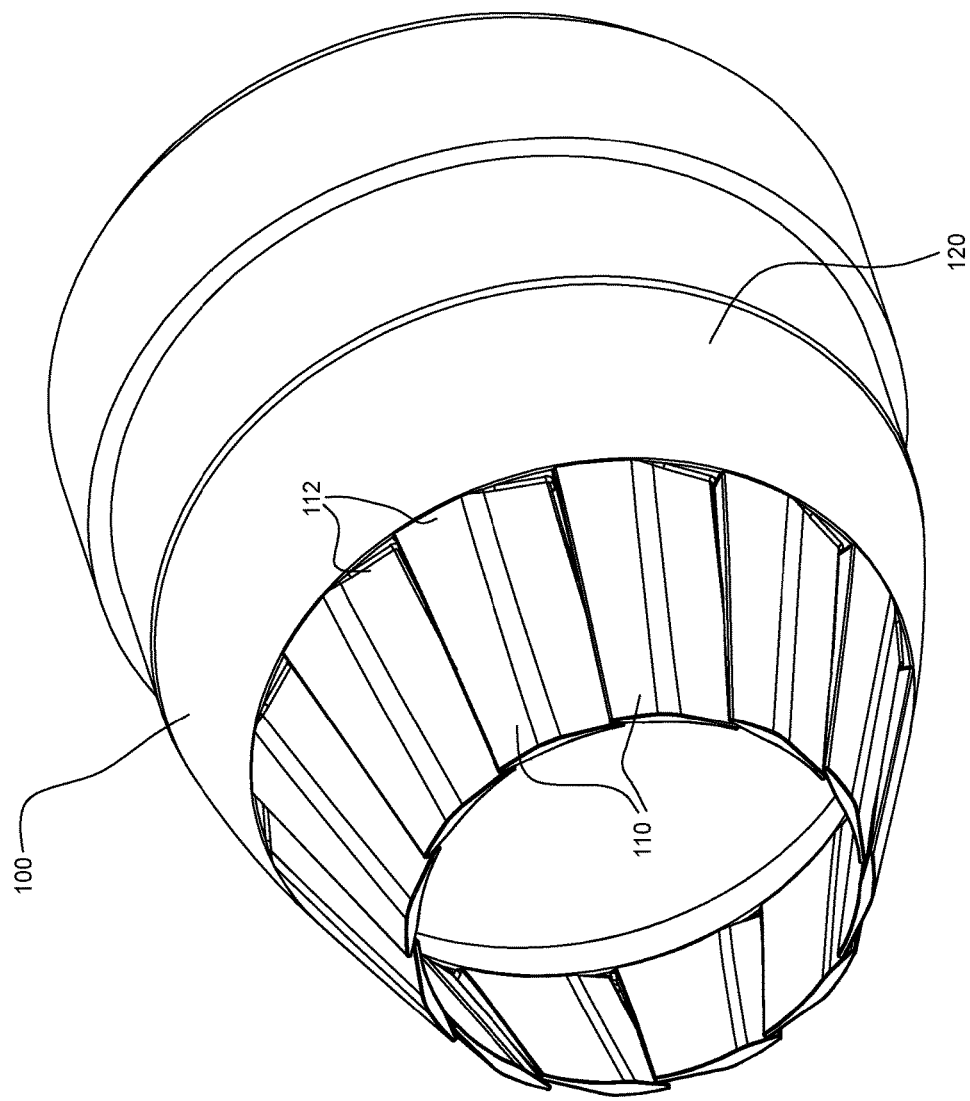
FIG. 4 is perspective view of the inlet-adjustment mechanism, viewed generally downstream-looking-upstream, with the mechanism in the closed position.
Figure 7:
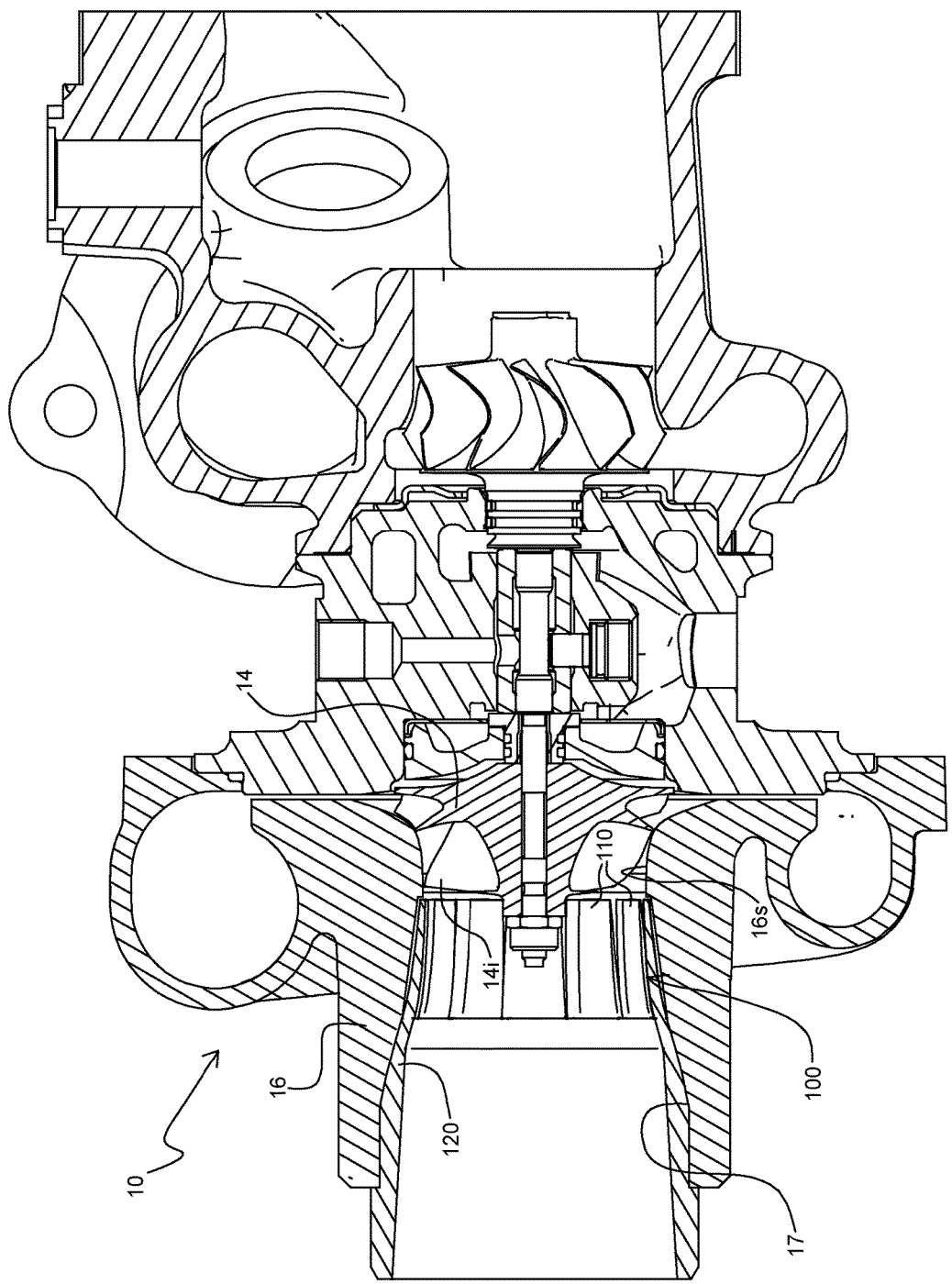
Figure 9A:
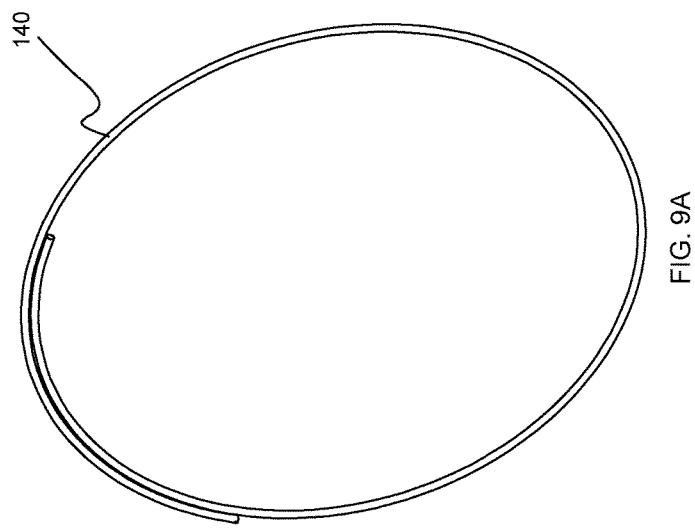
Figure 9B:
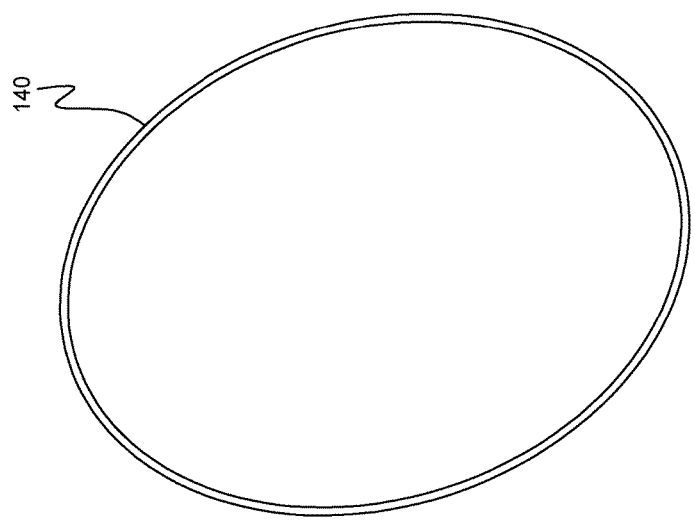

FIG. 7 is a cross-sectional view similar to FIG. 2, with the inlet-adjustment mechanism in the open position; and FIG. 8 is similar to FIG. 4, with the inlet-adjustment mechanism in the open position, and also showing an alternative embodiment having a biasing member encircling the vanes; and FIGS. 9A through 9C respectively show three alternative embodiments of biasing members for the inlet-adjustment mechanism.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
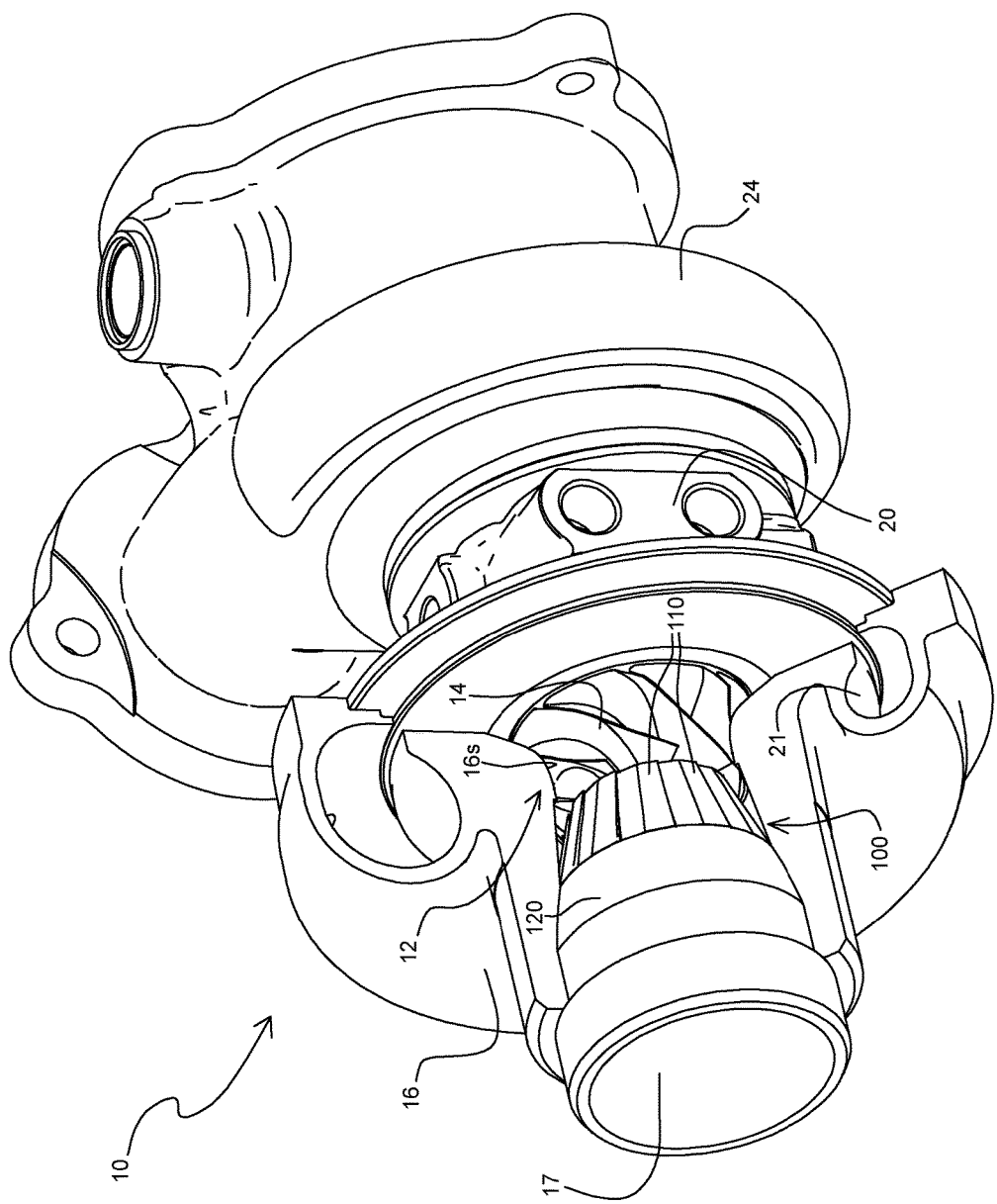
FIG. 1 is a perspective view of a turbocharger, with a portion of the compressor housing cut away to show internal details, in accordance with one embodiment of the invention, wherein the inlet-adjustment mechanism is in the closed position.

A turbocharger 10 in accordance with one embodiment of the invention is illustrated in perspective view in FIG. 1, and in cross-sectional view in FIG. 2. The turbocharger comprises a compressor 12 having a compressor wheel or impeller 14 mounted in a compressor housing 16 on one end of a rotatable shaft 18. The compressor housing defines an air inlet 17 for leading air generally axially into the compressor wheel 14. The shaft 18 is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The compressor housing 16 defines a shroud surface 16s that is closely adjacent to the radially outer tips of the compressor blades. The shroud surface 16s defines a curved contour that is generally parallel to the contour of the compressor wheel. At the inlet to the inducer portion 14i of the compressor wheel, the shroud surface 16s has a diameter that is slightly greater than the diameter of the inducer portion 14i.

The turbocharger further includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flows through the passages between the blades 30 of the turbine wheel, the gas is expanded to a lower pressure, and the gas discharged from the wheel exits the turbine housing through a generally axial bore 32 therein.

In accordance with the invention, the compressor of the turbocharger includes a passive inlet-adjustment mechanism 100 disposed in the air inlet 17 of the compressor housing just upstream of the shroud surface 16s and inducer portion 14i. The mechanism 100 is movable between a closed position (FIGS. 1-5) and an open position (FIGS. 6-8). The passive inlet-adjustment mechanism comprises a plurality of vanes 110 constructed of a flexible material, for instance, plastic, a non-limiting example of which is HYTREL®. HYTREL® is the trade name for a thermoplastic polyester elastomer sold in various grades by Dupont USA. The vanes have leading edges 112 joined to a ring 120 mounted in the air inlet 17. The vanes are distributed circumferentially about the ring 120 such that the ring and the vanes collectively form a duct as shown for example in FIG. 2. Because of the close proximity of the duct's trailing edge to the inducer portion 14i of the compressor wheel, an effective diameter of the air inlet at the inducer portion is determined by a trailing edge inside diameter of the duct. The trailing edge of the passive inlet-adjustment mechanism 100 is spaced upstream of the inducer portion 14i of the compressor wheel 14 by as small a distance as practicable so as to maximize the effect of the mechanism on the effective diameter of the air inlet at the inducer portion.

The current embodiment is a passive mechanism in which the vanes 110 are movable in the radially outward direction solely by aerodynamic forces exerted on the vanes by the air flowing to the compressor wheel 14. The duct has a tapering configuration when the vanes are in a relaxed state such that the trailing edge inside diameter of the duct is smaller than that of the shroud surface 16s, as best seen in FIG. 2. When the aerodynamic forces acting radially outwardly on the vanes become sufficiently large, the vanes are pivoted outwardly so as to increase the trailing-edge inside diameter of the duct, as shown in FIG. 7.

In the embodiment illustrated in the drawings, the ring 120 to which the vanes 110 are attached is formed separately from the compressor housing 16 and is affixed within the air inlet 17 of the compressor housing. The ring can be attached to the compressor housing using fasteners or it can be a press fit.

Alternatively, the ring 120 can be part of the compressor housing such that the vanes are directly affixed to the compressor housing.

At low flow rates (e.g., low engine speeds), the passive mechanism will move to the closed position of FIG. 2. This has the effect of reducing the effective inlet diameter into the inducer portion 14i of the compressor wheel and thereby increasing the flow velocity into the wheel. The result will be a reduction in compressor blade incidence angle, effectively stabilizing the flow, making blade stall and compressor surge less likely. In other words, the surge line of the compressor will be moved to lower flow rates (to the left on a map of compressor pressure ratio versus flow rate).

At high flow rates, the passive mechanism partially or fully opens (FIG. 7), depending on the particular operating conditions. When the passive mechanism is fully opened, the compressor regains its high-flow performance and choke flow characteristics, essentially as if the inlet-adjustment mechanism were not present and as if the compressor had a conventional inlet matched to the wheel diameter at the inducer portion of the wheel.

The amount of change of the inlet area in relation to mass flow rate depends upon dimensioning and configuration of the vanes 110. The vane thickness primarily depends on the material properties, and should be optimized with respect to expected flow rates. If the vane thickness is too large, the gradual change in the flow rate will not impose sufficient force to expand or contract the vanes.

Aside from thickness, the design of the proposed passive variable inlet duct depends upon various other parameters such as:
 the distance between vanes;
 the length of the vanes;
 the form or shape of the vanes;
 the exit diameter of the duct; and
 the number of vanes.

The performance of the passive inlet-adjustment mechanism can be tailored by appropriate selection of these variables.

In one embodiment the ring 120 is formed of a different material from the flexible material of the vanes 110. For example, the ring can be formed of metal.

Alternatively the ring can be formed of the same flexible material as the vanes.

In one embodiment, in the relaxed state of the vanes 110 there are gaps in a circumferential direction between side edges of adjacent vanes.

Figure 5:
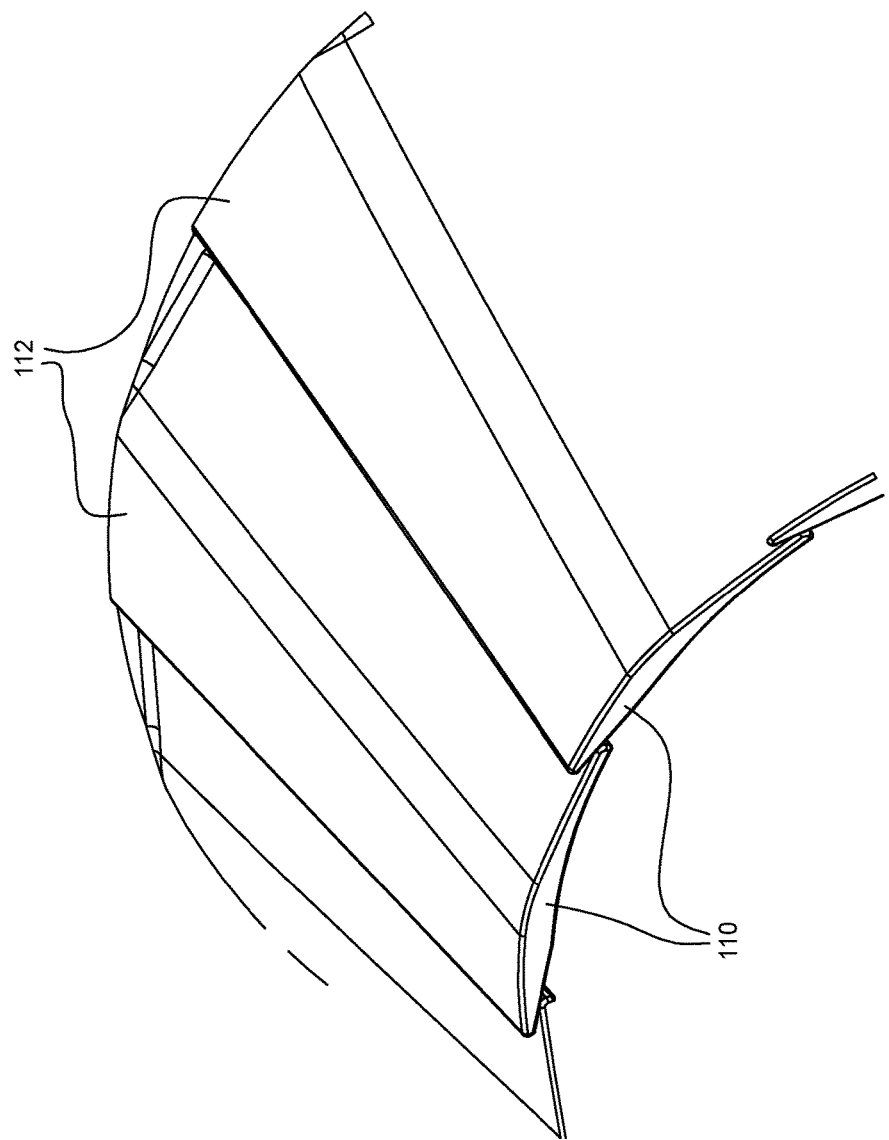
FIG. 5 is a magnified perspective view of a portion of the inlet-adjustment mechanism in the open closed, showing the overlapping of the vanes.
Figure 6:
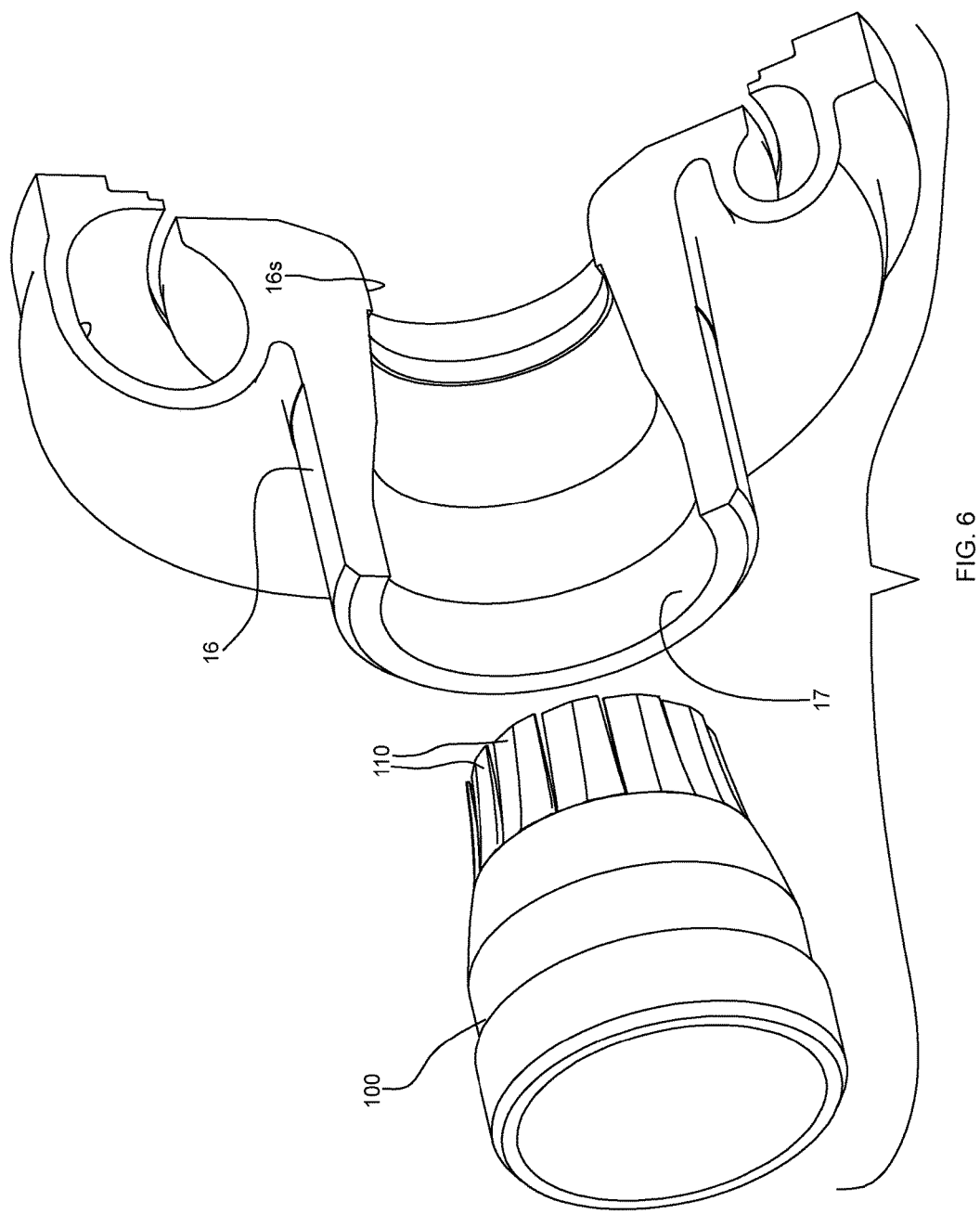
FIG. 6 is view similar to FIG. 3, with the inlet-adjustment mechanism in the open position.

In another embodiment, in the relaxed state the vanes partially overlap in a circumferential direction, as shown for example in FIGS. 4 and 5. This partial overlap can be helpful in reducing leakage of air through the spaces between adjacent vanes when the mechanism is closed.

Because the vanes 110 deform as the mass flow rate increases and because there can be mass flow fluctuation, there is a possibility of fluttering of the vanes. To eliminate this possibility, FIG. 8 illustrates an alternative embodiment in which there is a biasing member 140 encircling the duct adjacent the trailing edge thereof. The biasing member exerts a generally radially inward biasing force on the vanes 110, in order to maintain the vane position and to minimize vibration or fluttering. As depicted in FIGS. 8 and 9A for example, the biasing member 140 can be a metal spring wire that passes through openings defined by brackets 150 attached at the trailing ends of the vanes. Alternatively, as shown in FIG. 9B, the biasing member 140 can be an elastomeric ring such as a rubber ring or the like, similarly secured at the trailing edges of the vanes. Yet another alternative is shown in FIG. 9C, illustrating a biasing member 140 in the form of a coiled hoop. The biasing members of FIGS. 9A-9C all have the function of allowing the diameter of the biasing member to expand under the influence of the radially outward aerodynamic forces on the vanes 110, and exerting a radially inward biasing force on the vanes as a result of such expansion, such that when the aerodynamic forces are reduced, the biasing member urges the vanes to return to their relaxed positions.

The proposed compressor passive inlet-adjustment mechanism offers the following advantages over existing variable trim mechanisms:
 no actuation system required for varying the inlet area of the compressor, which means reduced weight and cost;
 reduced complexity of installation in the compressor inlet as compared to existing systems;
 gradual trim variation as a function of flow rate because of optimized flexible vane thickness.

The proposed designs for passive inlet-adjustment mechanism can be used at the inlets of various types of compressors including but not limited to centrifugal compressors in turbochargers, compressors in gas turbine engines, and superchargers, in order to improve compressor stability and its low-flow performance. The described system helps to shift the surge limit at low mass flow rate at given compressor wheel rotating speeds.

Many modifications and other embodiments of the inventions set forth herein will come to mind to one skilled in the art to which these inventions pertain having the benefit of the teachings presented in the foregoing descriptions and the associated drawings. For example, while the inlet-adjustment mechanism of the present disclosure is described as a variable-geometry conical mechanism, it will be understood that the term "conical" merely connotes a generally tapering structure that becomes smaller in diameter along the flow direction approaching the compressor wheel. There is no strict requirement that the structure be purely or even generally conical. As an example, the vanes forming the variable-geometry conical mechanism could be curved along the axial direction. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the inducer portion of the compressor wheel, the compressor housing further defining a volute for receiving compressed air discharged generally radially outwardly from the compressor wheel, the air inlet having an inner surface that extends for an axial length along a downstream direction, followed by an inlet-adjustment mechanism disposed in the air inlet, followed by a shroud surface that is adjacent to outer tips of the blades of the compressor wheel;

the inlet-adjustment mechanism comprising a plurality of vanes constructed of a flexible material, the vanes having leading edges joined to a ring mounted in the air inlet and the vanes being distributed circumferentially about the ring such that the ring and the vanes collectively form a duct, wherein an effective diameter of the air inlet at the inducer portion is determined by a trailing edge inside diameter of the duct, the vanes being movable in a radially outward direction by aerodynamic forces exerted on the vanes by the air flowing to the compressor wheel, the duct having a tapering configuration when the vanes are in a relaxed state such that the trailing edge inside diameter of the duct is smaller than that of the shroud surface, said aerodynamic forces exerted radially outwardly on the vanes causing the vanes to flex generally radially outwardly and increase the trailing edge inside diameter of the duct at the inducer portion, thereby increasing the effective diameter of the air inlet, wherein the inlet-adjustment mechanism is passive such that the vanes are movable in the radially outward direction solely by the aerodynamic forces exerted on the vanes.

2. The turbocharger of claim 1, wherein the ring is formed separately from the compressor housing and is affixed within the air inlet of the compressor housing.

3. The turbocharger of claim 2, wherein the ring is formed of a different material from the flexible material of the vanes.

4. The turbocharger of claim 3, wherein the ring is formed of metal.

5. The turbocharger of claim 2, wherein the ring is formed of the same flexible material as the vanes.

6. The turbocharger of claim 1, wherein in the relaxed state of the vanes there are gaps in a circumferential direction between side edges of adjacent vanes.

7. The turbocharger of claim 1, wherein in the relaxed state the vanes partially overlap in a circumferential direction.

8. The turbocharger of claim 1, further comprising a biasing member encircling the duct adjacent the trailing edge thereof, the biasing member exerting a generally radially inward biasing force on the vanes.

9. The turbocharger of claim 8, wherein the biasing member comprises a metal spring wire.

10. The turbocharger of claim 8, wherein the biasing member comprises an elastomeric ring.

11. The turbocharger of claim 8, wherein the biasing member comprises a coiled hoop.

* * * * *